(12) United States Patent
Speggiorin et al.

(10) Patent No.: US 11,428,364 B2
(45) Date of Patent: Aug. 30, 2022

(54) TRIPOD FOR VIDEO-PHOTOGRAPHIC EQUIPMENT WHICH CAN BE CONVERTED INTO A MONOPOD

(71) Applicant: VITEC IMAGING SOLUTIONS S.P.A., Cassola (IT)

(72) Inventors: Paolo Speggiorin, Mussolente (IT); Marco Frasson, Onara di Tombolo (IT)

(73) Assignee: VITEC IMAGING SOLUTIONS S.P.A., Cassola (IT)

( * ) Notice: Subject to any disclaimer, the term of this patent is extended or adjusted under 35 U.S.C. 154(b) by 0 days.

(21) Appl. No.: 17/256,771

(22) PCT Filed: Jun. 20, 2019

(86) PCT No.: PCT/IB2019/055203
§ 371 (c)(1),
(2) Date: Dec. 29, 2020

(87) PCT Pub. No.: WO2020/008288
PCT Pub. Date: Jan. 9, 2020

(65) Prior Publication Data
US 2021/0278031 A1   Sep. 9, 2021

(30) Foreign Application Priority Data
Jul. 2, 2018 (IT) .................. 102018000006851

(51) Int. Cl.
*F16M 11/32* (2006.01)
*F16M 11/04* (2006.01)
(Continued)

(52) U.S. Cl.
CPC .......... *F16M 11/32* (2013.01); *F16M 11/046* (2013.01); *F16M 11/34* (2013.01); *G03B 17/561* (2013.01); *F16M 2200/027* (2013.01)

(58) Field of Classification Search
CPC ........ F16M 11/32; F16M 11/34; F16M 11/36; F16M 11/046; F16M 2200/027; F16M 2200/08; G03B 17/561
(Continued)

(56) References Cited

U.S. PATENT DOCUMENTS 7,441,339 B2 * 10/2008 Kallabis ................. G01C 15/00
                                                              33/286
10,288,196 B2 *  5/2019 Hu ............................ F16L 9/14
(Continued)

FOREIGN PATENT DOCUMENTS

KR    2010 0091043 A    8/2010
WO    2014191507 A1    12/2014

OTHER PUBLICATIONS

International Preliminary Report on Patentability in PCT/IB2019/055203, dated Jan. 14, 2021.

*Primary Examiner* — Nkeisha Smith
(74) *Attorney, Agent, or Firm* — Volpe Koenig

(57) ABSTRACT

A tripod for video-photographic equipment comprises: —a plurality of legs (3) which are articulated to a cross-piece (2), in which at least one of the legs is a removable leg (30) which is connected to the cross-piece in a separable manner; —a column (5) which is provided with an attachment element (6) of a video-photographic equipment item and which is engaged with the ability to slide in the cross-piece (2) and which is separable from the cross-piece; —an end element (10) which is provided on the column (5) at the axially opposite side to the attachment element (6). The end element (10) comprises a first connection device (13) in order to removably fix the end element to the removable leg (30) so as to form a monopod (100) by connecting, by means of the end element (10), the removable leg (30) and the column (5) to each other when they are separated from the cross-piece.

10 Claims, 4 Drawing Sheets

(51) Int. Cl.
*G03B 17/56* (2021.01)
*F16M 11/34* (2006.01)

(58) Field of Classification Search
USPC .......................................... 248/125.8, 163.1
See application file for complete search history.

(56) References Cited

U.S. PATENT DOCUMENTS

| | | | | |
|---|---|---|---|---|
| 10,859,202 | B2* | 12/2020 | Wilson | F16M 11/28 |
| 2003/0234326 | A1* | 12/2003 | Crain | F16M 11/28 |
| | | | | 248/176.1 |
| 2003/0235459 | A1* | 12/2003 | Crain | F16M 11/10 |
| | | | | 403/170 |
| 2013/0134268 | A1* | 5/2013 | Wessells | F16M 11/16 |
| | | | | 248/157 |
| 2014/0037281 | A1* | 2/2014 | Carney | G03B 17/561 |
| | | | | 396/421 |
| 2016/0116103 | A1* | 4/2016 | Gabrielli | F16M 11/16 |
| | | | | 248/125.8 |
| 2018/0324360 | A1* | 11/2018 | Gabrielli | F16M 11/28 |

* cited by examiner

TRIPOD FOR VIDEO-PHOTOGRAPHIC EQUIPMENT WHICH CAN BE CONVERTED INTO A MONOPOD

TECHNICAL FIELD

The present invention relates to a tripod for video-photographic equipment of the type which can be converted into a monopod, having the features set out in the preamble of the main claim.

BACKGROUND ART

In the technical field of photography, it is widely known to use devices for supporting the photographic equipment, among which tripods and monopods are particularly widespread and appreciated, at both amateur and professional level.

Tripods generally comprise a plurality of legs, which are generally telescope-like and which are hinged to a cross-piece, in which there is engaged with the ability to slide a support column, to an end of which there is fixed the video/photographic equipment, while monopods comprise a single telescope-like leg, to the upper end of which the video/photographic equipment is fixed. Tripods allow more stable positioning operations while monopods are lighter and more rapid.

In the relevant technical field, there are further known tripods which can be converted into monopods. In these tripods, there is provision for one of the telescope-like legs to be removable from the cross-piece and to be able to be directly connected to the column of the tripod which, to this end, also has to be removed from the cross-piece.

The column generally comprises an end element which is fixed at the opposite end to the video/photographic equipment and which in turn has a cross-section which is greater than the shank of the column so as to act as a travel limit stop and to prevent the column from slipping out of the cross-piece.

Therefore, in order to be able to separate the column from the cross-piece, it is necessary to remove this end element.

The leg which is separated from the cross-piece is therefore fixed to the column, obtaining a monopod.

However, the convertible tripod which is constructed according to the prior art described above has some disadvantages, including the risk of mislaying the end element once it has been separated from the column.

Another disadvantage is the fact that the reconstruction of the tripod requires that the leg which forms the monopod be mounted on the cross-piece with a very specific angular orientation in order to maintain the correct functionality of the tripod.

Another disadvantage is that, at the time of disassembly of the leg from the cross-piece, there is the risk of the leg inadvertently falling from the cross-piece.

In specific terms, in the description and the claims which follow, the term "tripod" is intended to be understood to indicate a stand which is provided with a cross-piece, to which there are articulated a plurality of legs without any specific limitations on the number of legs themselves which may be three or also a number other than three.

DISCLOSURE OF INVENTION

The problem underlying the present invention is to provide a tripod for video/photographic equipment which can be converted into a monopod, which is structurally and functionally configured to at least partially overcome one or more of the drawbacks set out above with reference to the cited prior art.

This problem is solved by the present invention by means of a tripod which is realised according to the appended claims.

Therefore, in a first aspect thereof, the present invention relates to a tripod for video/photographic equipment comprising:

a plurality of legs which are articulated to a cross-piece and at least one of which is fixed in a removable manner to the cross-piece in the region of a first end thereof;

a column which is provided at a first end thereof with an attachment element of a video-photographic equipment item, wherein the column is removably engaged in a sliding manner inside a seat which is formed in the cross-piece and is separable from the cross-piece; and an end element which is separate from the column and which is connected to a second end of the column which is axially opposite the attachment element, wherein the end element comprises a first connection device in order to be removably fixed to the first end of the leg which is removed from the cross-piece.

In this manner, there can be formed a monopod by removing the column and the leg and then by fixing the end element to the leg at the opposite side to the column.

As a result of this feature, the end element acts as a connection between the column and leg, preventing any risk of mislaying the end element. Furthermore, in this manner, the type of connection between the end element and the leg may be provided and configured in a manner independent of the connection between the column and the end element, so that the type of connection more secure and effective may be selected.

In the context of the aspect set out above, the tripod according to the present invention may have at least one of the preferred features set out below.

Preferably, the end element has a greater cross-section than the cross-section of the seat, in which the column is slidingly engaged.

In this manner, the end element acts as a travel limit stop and prevents the column from slipping out of the cross-piece.

In a first preferred embodiment, the end element is provided with a jutting out projection which acts as a travel limit stop and which can be retracted in order to allow the column to be detached from the cross-piece.

In this case, the end element may advantageously always remain fixed to the column while the projection which acts as a travel limit stop may comprise a push-button or a lever which is resiliently urged to jut out radially but which can be moved manually or with another type of control by the operator.

In a second preferred embodiment, the end element is fixed to the column in a removable manner so as to allow, after being suitably removed, the column to be detached from the cross-piece.

Preferably, the end element comprises a second connection device which is separate from the first connection device and which is provided to removably fix the end element to the second end of the column.

It is particularly preferable for the first connection device and the second connection device to be directed at opposite sides of the end element so as to allow simultaneous fixing of the column and the leg at axially opposite sides.

Preferably, the first connection device comprises a thread which is formed on the end element and which is provided to engage in a corresponding thread which is formed on the first end of the leg removed from the cross-piece.

In this manner, the connection between the end of the removable leg and the end element is of the screw type, being particularly secure and reliable.

Alternatively, there may be provided other types of connection between the removable leg and the end element, such as, for example, an interlocking connection or a connection with an eccentric profile.

Preferably, the cross-piece comprises a sleeve which is provided to receive an insertion portion of the removable leg, and a locking mechanism which is provided to lock and unlock the insertion portion inside the sleeve.

Preferably, there are provided in the sleeve and in the insertion portion respective positioning elements in order to allow the insertion portion to be received in the sleeve in a predefined angular position.

In this manner, the insertion portion and therefore the leg may be re-assembled on the cross-piece in the correct manner, with reference, for example, to the feet of the leg which generally do not have a perpendicular base with respect to the axis of the leg but which are inclined so as to be in complete support when the legs are oscillated into an open configuration with respect to the cross-piece (for example, during a step of positioning the tripod).

In a particularly preferred embodiment, the positioning elements comprise a radially jutting out projection which is formed in one of the sleeve and the insertion portion and a seat which is formed in the other of the sleeve and the insertion portion and which is capable of engaging with the projection.

Preferably, the locking mechanism comprises a radially contractile collar which is supported on the sleeve and which is capable of being tightened around the insertion portion in order to lock the sliding of the insertion portion with respect to the sleeve.

In a preferred embodiment, there is provided on the insertion portion a fall prevention element which prevents the sudden detachment of the removable leg from the cross-piece when the locking mechanism is unlocked.

It is particularly preferable for the fall prevention element to comprise a relief which is formed on the insertion portion and which is positioned between the collar and the first end of the leg, which relief is capable of abutting against the collar when it is loosened to release the insertion portion.

In this manner, the leg, by becoming detached inadvertently from the cross-piece, is prevented from falling to the ground, being damaged or damaging other components or pieces of equipment.

BRIEF DESCRIPTION OF THE DRAWINGS

The features and advantages of the invention will be better appreciated from the detailed description of a preferred embodiment thereof, which is illustrated by way of non-limiting example with reference to the appended drawings, in which.

PREFERRED EMBODIMENT OF THE INVENTION

Figure 1:
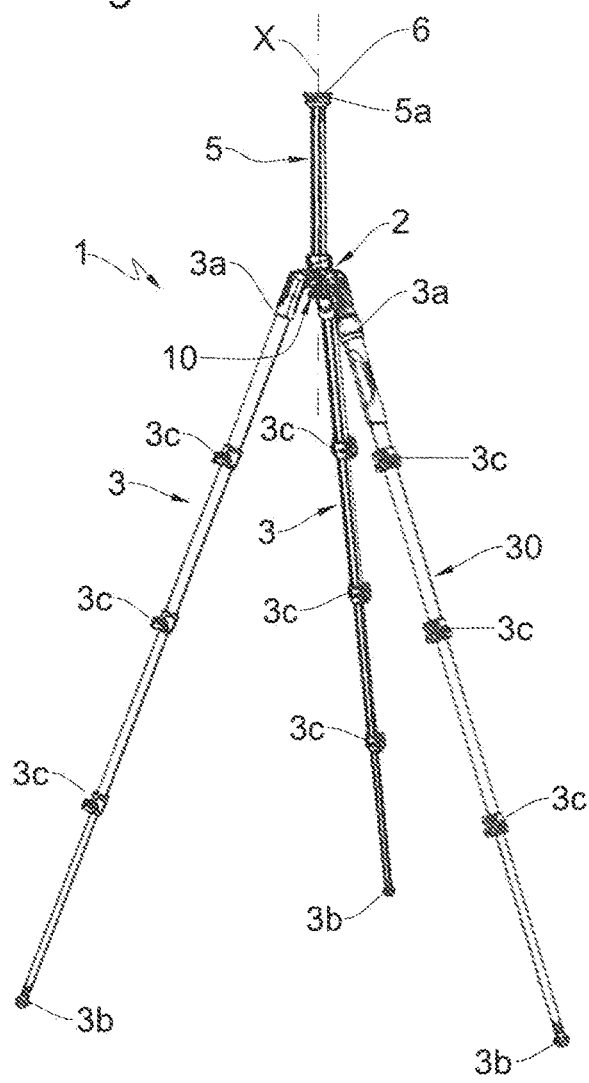
FIG. 1 is a perspective view of a tripod for video/photographic equipment which is realised according to the present invention, in an open configuration.

In the Figures, there is generally designated 1 a tripod which is realised according to the present invention.

The tripod 1 comprises a cross-piece 2, to which a plurality of legs generally designated 3 are articulated.

The legs 3 are preferably telescope-like and are articulated to the cross-piece 2 in the region of a respective first end 3a thereof while an opposite second end, which is suitably provided with a foot 3b, is intended for support on the ground.

Each leg 3 is provided with locking means 3c of the respective telescope-like extension and is articulated in terms of oscillation between an open configuration in which the legs 3 are moved apart from each other so as to increase the support plane on the ground of the tripod 1 (illustrated in FIG. 1) and a closed configuration in which the legs 3 are moved close to one another.

One of the legs 3 is removably fixed to the cross-piece 2 in the region of a first end 3a thereof. This leg, which may be any of the legs 3, is identified below as the "removable leg" and is designated 30 in the appended Figures.

There is formed in a central member 2a of the cross-piece 2 a through-opening 4 with a substantially cylindrical cross-section with an axis X defining a so-called "panoramic" axis of the tripod 1.

The tripod 1 further comprises a column 5, at a first end 5a of which an attachment element 6 is provided, the attachment element comprising, for example, a plate or a threaded pin which is arranged to fix a video/photographic equipment or alternatively a support head for a video/photographic equipment, which is conventional per se and which is not illustrated in the appended Figures.

The column 5 is received in engagement in the opening 4 of the cross-piece 2 with an ability to slide along the axis X between a retracted position in which the attachment element 6 is near the cross-piece 2, substantially in abutment therewith, and an extended position, in which the attachment element 6 is moved apart from the cross-piece 2 (see FIG. 1).

The sliding motion along the axis X of the column 5 with respect to the cross-piece 2 may be locked in a desired position by a locking member of a type which is known per se in the technical field.

In the region of a second end 5b of the column 5, which is axially opposite the attachment element 6, an end element 10 is provided.

The end element 10 has a generally cup-like shape and comprises a base 11 which is in abutment against the end 5b of the column 5, and a peripheral collar 12 which extends in an axial direction away from the column 5 so that the concavity of the end element 10 is directed towards the outer side of the column 5.

There is formed inside the peripheral collar 12 a thread 13 which is provided to engage with a corresponding thread 14 which is formed externally with respect to the first end 3a of the removable leg 30.

The thread 13 which is formed on the peripheral collar 12 constitutes a first connection device which allows the end element 10 to be connected to the removable leg 30 in a secure manner.

The end element 10 has a greater cross-section than the column 5 and also greater than the cross-section of the seat 4 so that it acts as a travel limit stop, preventing the column 5 from slipping out of the cross-piece 2.

At the opposite side to the peripheral collar 12, there further extends axially from the base 11 of the end element 10 a shank 15 which is externally threaded and which is arranged to be connected to a corresponding thread which is formed in a seat 16 which is provided on the column 5 in the region of the second end 5b.

The threaded shank 15 constitutes a second connection device which allows the end element 10 to be connected in a secure manner to the column 5 at the opposite side to the removable leg 30 and in a manner independent thereof.

In this manner, the end element 10 is fixed to the column 5 in a removable manner so that, once removed, the column 5 can be separated from the cross-piece 2 by being slipped out of the seat 4.

The cross-piece 2 further comprises a sleeve 20 which is provided to receive an insertion portion 31 of the removable leg 30 and a locking mechanism 21 which is provided to lock and unlock the insertion portion 31 inside the sleeve 20.

The sleeve 20 is articulated to the central member of the cross-piece 2 so as to allow the oscillation of the removable leg 30.

Figure 6:
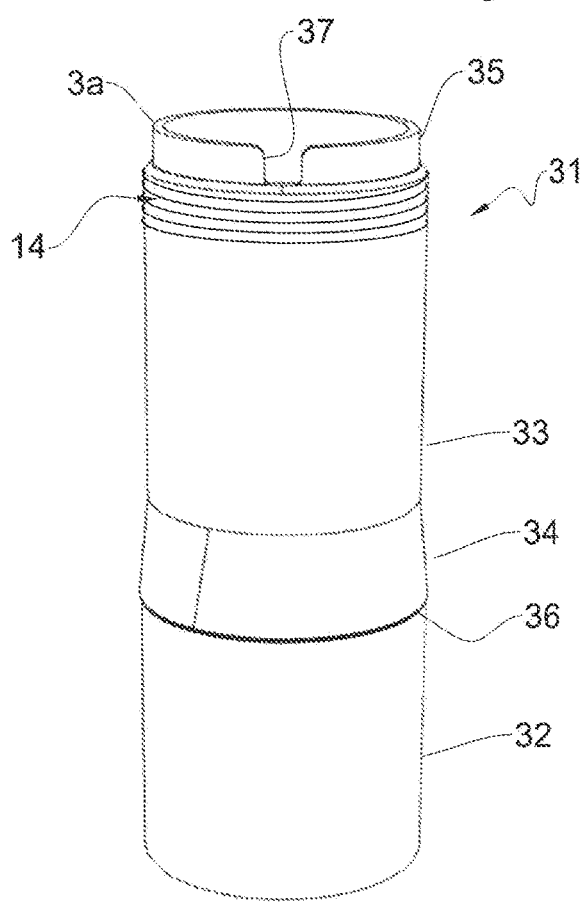
FIG. 6 is a perspective view of a component of the tripod of FIG. 1, in a state isolated from the rest of the tripod.
Figure 2:
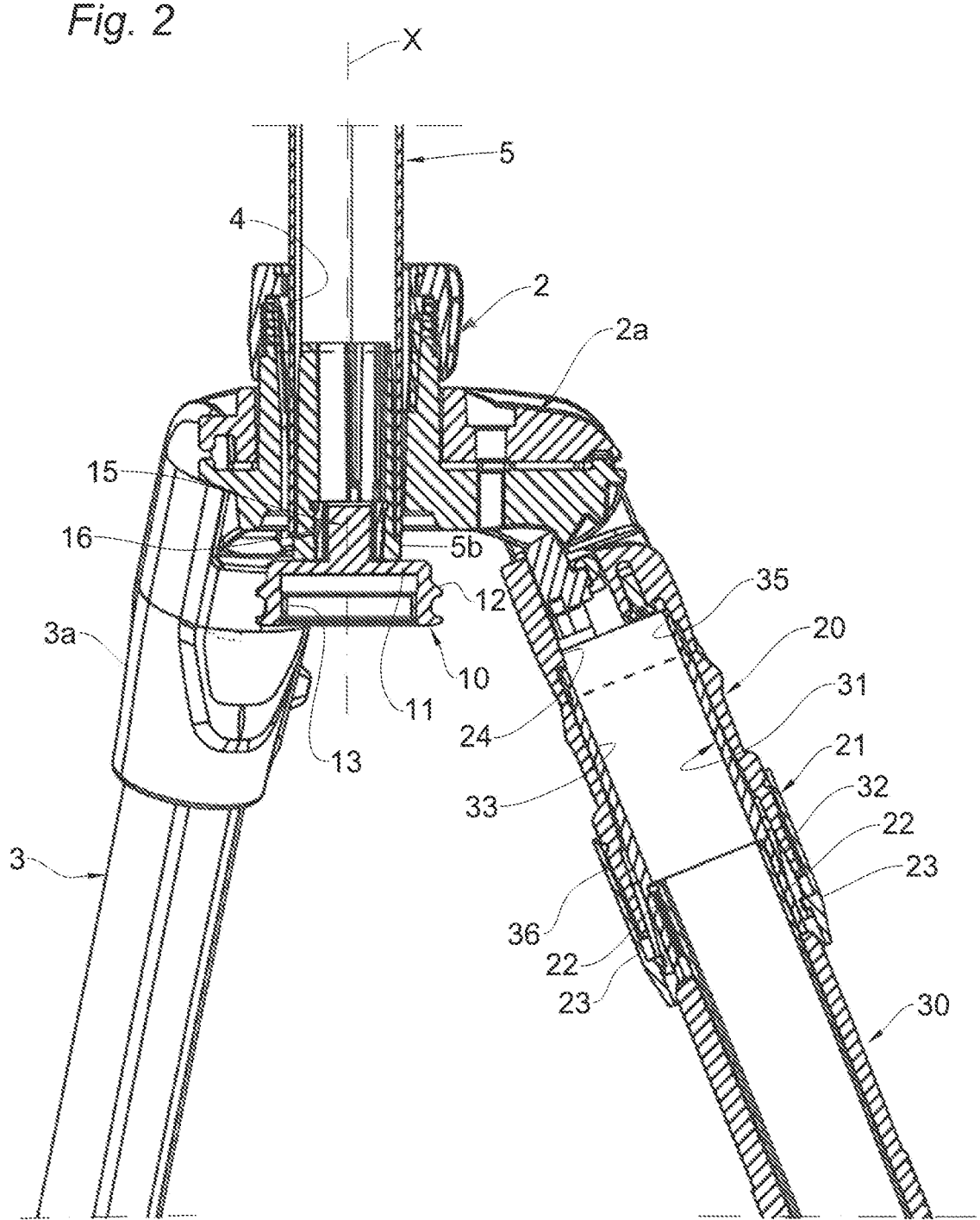
FIG. 2 is an axial section to an enlarged scale of a portion of the tripod of FIG. 1.
Figure 3:
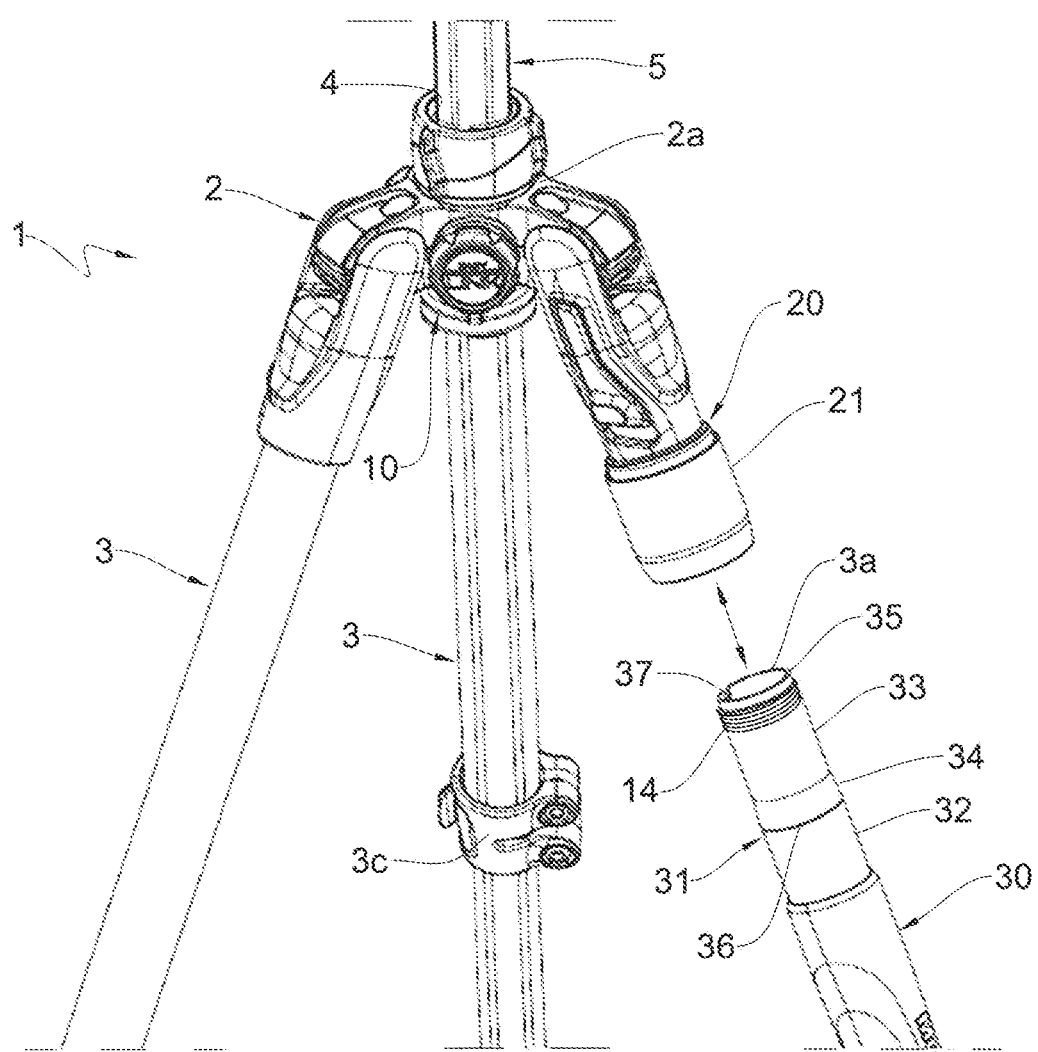
FIG. 3 is a partial perspective view of the tripod of FIG. 1 with a leg and the column separated from the cross-piece.

The insertion portion 31, which is illustrated to an enlarged scale in FIG. 6, has a generally cylindrical shape with a variable cross-section and, starting from the axially internal end thereof connected to the rest of the removable leg 30, comprises a first portion 32 with a greater diameter, a second portion 33 which has a slightly smaller diameter and which is connected to the first portion 32 by a joint connection 34 having a frustoconical profile and, finally, a collar 35 having a further reduced diameter.

The conformation of the insertion portion 31 with a gradually decreasing diameter towards the first end 3a of the removable leg 30 advantageously allows promotion and guiding of the insertion of the removable leg 30 inside the sleeve 20.

The thread 14 which allows connection of the removable leg 30 to the end element 10 is formed on the second portion 33 close behind the collar 35.

The locking mechanism 21 comprises a radially contractile collar 22 which is supported on the sleeve 20 and which is capable of being tightened around the first portion 32 of the insertion portion 31 in order to lock the sliding thereof inside the sleeve 20.

In particular, the collar 22 is connected to a ring 23 which is engaged in a screwing manner on an end portion of the sleeve 20 so that, by rotating the ring in one direction or the other, the collar 22 is moved axially inside the sleeve 20. The external wall of the collar 22 and the internal wall of the sleeve 20 in contact with the collar 22 have respective conical profiles so that, when the collar 22 is moved axially towards the interior of the sleeve 20, it is simultaneously urged to contract radially, becoming compressed around the first portion 32 of the insertion portion 31.

In order to unlock the insertion portion 31 and to allow the detachment of the removable leg 30 from the sleeve 20, it is simply necessary to rotate the ring 23 in the opposite direction.

Advantageously, there is provided on the insertion portion 31, in particular between the first portion 32 and the connection portion 34, a relief 36 which is circumferential and which has a diameter slightly greater than that of the first portion 32.

The relief 36 acts as a fall prevention element for the removable leg 30 and prevents the inadvertent detachment thereof from the cross-piece 2 when the locking mechanism 21 is unlocked.

In fact, when the collar 22 is loosened so as not to retain the removable leg in position any longer, the insertion portion 31 slides towards the outer side of the sleeve 20 until the relief 36 abuts against the upper edge of the collar 22, preventing the removable leg from falling.

In order to complete the removal action of the leg 30, it is necessary to loosen the collar 22 further.

There is further provided inside the sleeve 20 a projection 24 which juts out radially and which is capable of engaging in a seat 37 which is formed, for example, by a slot which is open towards the outer side and which is formed on the collar 35.

The projection 24 and the seat 37 act as positioning elements in order to allow the insertion portion 31 to be received in the sleeve 20 in a predefined angular position.

In different angular positions, in fact, the projection 24 abuts the upper edge of the collar 35, preventing the complete insertion of the insertion portion 31 in the sleeve 20.

When the removable leg 30 is fixed to the cross-piece 2, the tripod 1 can be used as a conventional tripod, by oscillating and extending as desired the legs 3, including the removable leg 30, so as to position the tripod in the position desired to take the photograph (or the video recording) by means of an equipment item which is mounted directly on the column 5 or, in a more suitable manner, mounted on a support head.

Figure 4:
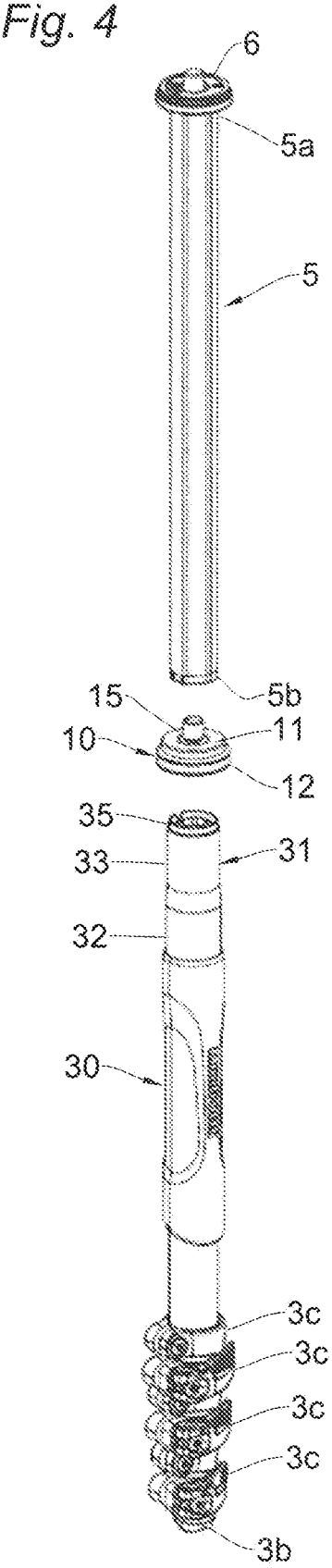
FIG. 4 is a view of a monopod which is formed from the tripod of FIG. 1 in a disassembled configuration.
Figure 5:
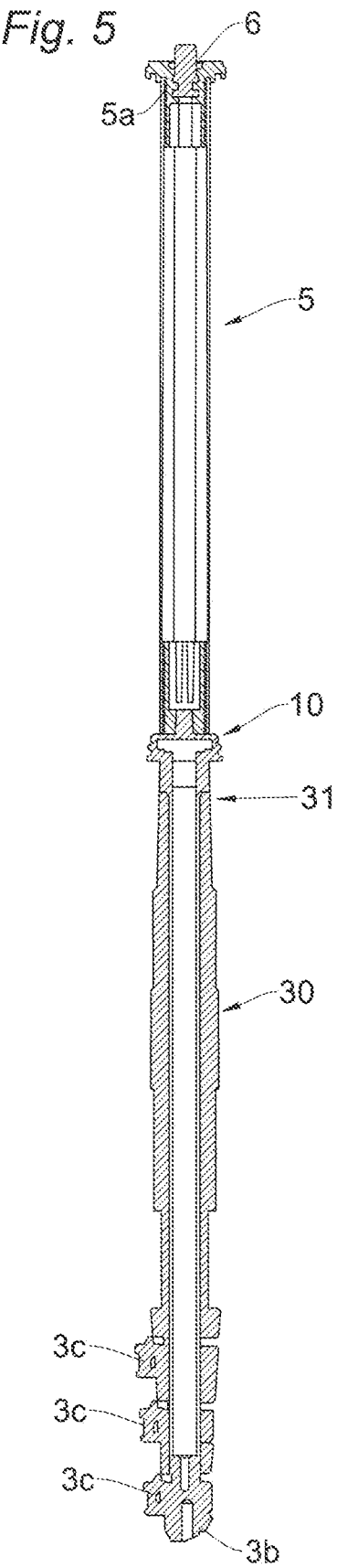
FIG. 5 is an axial section of the monopod of FIG. 4 in an assembled configuration.

As a result of the features of the present invention, the tripod 1 may further be converted into a monopod 100 which is illustrated in FIGS. 4 and 5.

In order to form the monopod 100, it is necessary to separate the column 5 and the removable leg 30 from the cross-piece 2. In particular, the column 5 is separated from the cross-piece 2 by removing it from the seat 4 thereof after removing the end element 10 by unscrewing the shank 15 from the seat 16 and the removable leg 30 is separated from the cross-piece 2 by unscrewing the ring 23 and removing the insertion portion 31 from the sleeve 20.

At this point, the end element 10 is connected to the removable leg by screwing the thread 13 which is formed on the peripheral collar 12 onto the corresponding thread 14 which is formed externally on the second portion 33 of the insertion portion 31 and the column 5 can again be connected to the end element 10 at the opposite side to the removable leg 30 by screwing the shank 15 in the seat 16, obtaining the monopod 100.

It will be noted that the monopod 100 therefore also comprises the end element 10, eliminating the risk of it being mislaid.

In order to return to the tripod-like configuration 1, it is simply necessary to repeat the above-described steps in the reverse order, re-producing the starting configuration with the removable leg 30 and the column 5 connected to the cross-piece 2.

Therefore, the present invention solves the problem set out above with reference to the cited prior art, at the same time affording a number of other advantages, including the fact that, as a result of the interposition of the end element between the removable leg and the column, the monopod obtained is particularly secure.

Naturally, in order to comply with specific and contingent application requirements, a person skilled in the art could apply to the above-described invention additional modifications and variants which are still included within the scope of protection as defined by the appended claims.

The invention claimed is:

1. A tripod for video-photographic equipment comprising:
a plurality of legs (3) which are articulated to a cross-piece (2), in which at least one of the legs is a removable leg (30) which is connected to the cross-piece in a separable manner in a region of a first end (3a) of the removable leg;
a column (5) which is provided at a first end (5a) thereof with an attachment element (6) of a video-photographic equipment, the column being removably engaged in a sliding manner inside a seat (4) which is formed in the cross-piece (2) and being separable from the cross-piece;
an end element (10) which is separate from the column and which is connected to a second end (5b) of the column (5) at an axially opposite side to the attachment element (6); the end element (10) comprises a first connection device (13) in order to removably fix the end element to the removable leg (30) in the region of the first end (3a) of the removable leg (30) so as to form a monopod (100) by connecting, by means of the end element (10), the removable leg (30) to the column (5) when the removable leg and the column are separated from the cross-piece.

2. The tripod according to claim 1, wherein the end element (10) has a greater cross-section than a cross-section of the seat (4), in which the column is slidingly engaged, so as to prevent accidental removal of the column (5) from the cross-piece (2).

3. The tripod according to claim 1, wherein the end element (10) comprises a second connection device (15) which is separate from the first connection device (13) and which is provided to removably fix the end element (10) to the second end (5b) of the column (5).

4. The tripod according to claim 1, wherein the first connection device comprises a thread (13) which is formed on the end element and which is capable of engagement in a corresponding thread (14) which is formed on the first end (3a) of the removable leg (30).

5. The tripod according to claim 1, wherein the cross-piece (2) comprises a sleeve (20) which is provided to receive an insertion portion (31) of the removable leg (30), and a locking mechanism (21) which is provided to lock and unlock a sliding of the insertion portion (31) in the sleeve (20).

6. The tripod according to claim 5, further comprising respective positioning elements (24, 37) in the sleeve (20) and in the insertion portion (31) in order to allow the insertion portion (31) to be received in the sleeve (20) in a predefined angular position.

7. The tripod according to claim 6, wherein the positioning elements comprise a radially jutting out projection (24) which is formed in one of the sleeve (20) and the insertion portion (31) and a seat (37) which is formed in the other of the sleeve and the insertion portion and which is capable of engaging with the projection.

8. The tripod according to claim 5, wherein the locking mechanism (21) comprises a radially contractile collar (22) which is supported on the sleeve (20) and which is capable of being tightened around the insertion portion (31) in order to lock a sliding of the insertion portion (31) with respect to the sleeve (20).

9. The tripod according to claim 5, further comprising a fall prevention element (36) on the insertion portion (31) which prevents sudden detachment of the removable leg (30) from the cross-piece (2) when the locking mechanism (21) is unlocked.

10. The tripod according to claim 9, wherein the fall prevention element comprises a relief (36) which is formed on the insertion portion (31) in a position between the collar (22) and the first end (3a) of the removable leg (30), the relief abutting against the collar (22) when it is loosened to release the insertion portion (31).

* * * * *